(12) United States Patent
Thorogood

(10) Patent No.: US 10,131,124 B2
(45) Date of Patent: Nov. 20, 2018

(54) MULTIPLE PLY PAPER PRODUCTS AND THEIR MANUFACTURE

(71) Applicant: MOO Print Limited, London (GB)

(72) Inventor: Paul Thorogood, London (GB)

(73) Assignee: MOO PRINT LIMITED, London (GB)

( * ) Notice: Subject to any disclaimer, the term of this patent is extended or adjusted under 35 U.S.C. 154(b) by 187 days.

(21) Appl. No.: 14/351,125

(22) PCT Filed: Oct. 11, 2012

(86) PCT No.: PCT/GB2012/000786
§ 371 (c)(1),
(2) Date: Apr. 10, 2014

(87) PCT Pub. No.: WO2013/054081
PCT Pub. Date: Apr. 18, 2013

(65) Prior Publication Data
US 2014/0227497 A1    Aug. 14, 2014

(30) Foreign Application Priority Data

Oct. 11, 2011 (GB) .................................. 1117544.5

(51) Int. Cl.
*B32B 29/00* (2006.01)
*B32B 7/12* (2006.01)
(Continued)

(52) U.S. Cl.
CPC .............. *B32B 29/005* (2013.01); *B32B 7/12* (2013.01); *B32B 38/145* (2013.01);
(Continued)

(58) Field of Classification Search
CPC ... B29C 47/0021; B29C 65/483; B29C 65/48; B29C 66/8322; B29C 65/4825;
(Continued)

(56) References Cited

U.S. PATENT DOCUMENTS 522,190 A    7/1894  Brandt
5,098,129 A    3/1992  Haber
(Continued)

FOREIGN PATENT DOCUMENTS

CN    1425593 A    6/2003
JP    04-222300 A    8/1992
(Continued)

OTHER PUBLICATIONS

Office Depot Office Max, Hammermill Laser Print Paper, Jun. 24, 2015.*
(Continued)

*Primary Examiner* — Vishal I Patel
(74) *Attorney, Agent, or Firm* — Maschoff Brennan

(57) ABSTRACT

A printed multiple ply paper article and a method of producing it are described. The method comprises providing a first paper stock having a first surface and a second surface, applying a pressure activated adhesive (33) to the second surface, printing (34) upon the first surface, and bringing together two portions of the second surface under pressure in registration (35, 36) to form a multiple ply product.

14 Claims, 4 Drawing Sheets

(51) Int. Cl.
*B42D 15/02* (2006.01)
*B32B 38/00* (2006.01)
*B42D 15/00* (2006.01)
*B32B 37/12* (2006.01)
*B42D 25/47* (2014.01)

(52) U.S. Cl.
CPC ......... *B42D 15/0093* (2013.01); *B42D 15/02* (2013.01); *B32B 37/12* (2013.01); *B32B 2250/26* (2013.01); *B32B 2307/75* (2013.01); *B32B 2425/00* (2013.01); *B42D 25/47* (2014.10); *B42D 2033/28* (2013.01); *Y10T 428/24934* (2015.01)

(58) Field of Classification Search
CPC ..... B32B 7/12; B32B 29/005; B32B 2250/26; B32B 2307/75; B32B 37/12; B32B 38/145; B32B 2425/00; B42D 15/02; B42D 15/0093; B42D 2033/28; B42D 25/47; Y10T 428/24934
USPC ................. 156/288, 244.27, 295, 306.3, 312
See application file for complete search history.

(56) References Cited

U.S. PATENT DOCUMENTS

| 5,229,190 | A | * | 7/1993 | Clement et al. | ........... 428/195.1 |
| 5,529,345 | A | | 6/1996 | Kohls | |
| 6,235,139 | B1 | * | 5/2001 | Vichinsky, Jr. | ........ B42D 5/027 156/219 |
| 2003/0141373 | A1 | * | 7/2003 | Lasch | .................. G06K 7/0008 235/487 |
| 2012/0050813 | A1 | * | 3/2012 | Gaash et al. | ................. 358/1.18 |
| 2012/0326429 | A1 | * | 12/2012 | Fischer et al. | .................. 283/75 |

FOREIGN PATENT DOCUMENTS

| WO | 03/043822 A1 | 5/2003 |
| WO | 2011/085506 A1 | 7/2011 |

OTHER PUBLICATIONS

GB Search Report dated Apr. 18, 2012 as received in Application No. 1117544.5.
Cindy Major, "Encre, papier, ciseaux: Tutorials / Tutoriels", available from Internet Archive Wayback Machine http://web.archive.org/web/20091220194106/http://cindymajor.typepad.com/encre_papier_ciseawdtutorials_tutoriels/ available Dec. 20, 2009 [viewed Apr. 16, 2012] See especially "Album Cover Tutorial" posted Apr. 23, 2009, in particular tip for step 6.

* cited by examiner

MULTIPLE PLY PAPER PRODUCTS AND THEIR MANUFACTURE

FIELD OF INVENTION

This invention relates to multiple ply paper products and their manufacture. In particular aspects, the invention relates to multiple ply card products such as business cards.

BACKGROUND TO INVENTION

It is desirable to produce multiple ply papers of high quality, particularly for business card design. It is particularly desirable to be able to produce papers of this type which can be printed effectively with a digital press (for example, one of the digital presses in the HP Indigo product family). Conventional processes can be used for printing business cards on a digital press, but high quality multiple ply papers cannot be handled effectively in a conventional digital press. Other printing technologies consequently have to be used to print to such papers, so the many processing advantages of a digital press (high speed at high quality with sheet-to-sheet customisation) cannot be used in creating business cards on such papers.

SUMMARY OF INVENTION

Accordingly the invention provides a method of producing a printed multiple ply paper comprising providing a first paper stock having a first surface and a second surface, applying a pressure activated adhesive to the second surface, printing upon the first surface, and bringing together two portions of the second surface under pressure in registration to form a multiple ply product.

In a particularly preferred arrangement, the step of printing upon the first surface comprises printing, separately, on a first sheet of the paper stock and a second sheet of the paper stock, and the step of bringing together the two portions of the second surface under pressure in registration comprises bonding the second surfaces of the first sheet and the second sheet. This is particularly effective as an approach for printing a stack of multiple ply sheets. This approach can be used to print a stack of first sheets and second sheets in sequence, such that on bringing together the two portions of the second surface under pressure in registration the second surfaces of each first sheet and its corresponding second sheet are bonded together to form a stack of bonded sheets.

This approach is particularly effective for preparing a stack of business cards. A plurality of discrete card stacks can be formed by the following approach. Each first surface is divided into a plurality of discrete card stack areas, and wherein after formation of the stack of bonded sheets the discrete card stack areas are separated to form a plurality of discrete card stacks.

Preferably the first paper stock is a duplex stock, preferably with one layer of the duplex stock having one colour and the other layer having another colour. This method is particularly appropriate for the production of business cards. For example, if the layer providing the first surface is white and the layer providing the second surface is coloured, then the method can be used to produce a business card with a coloured stripe effect.

Preferably, printing said first surface comprises printing on the first surface in a digital press. Where a stack of sheets is to be formed from separately printed sheets, preferably printing said first surface comprises printing in a duplex mode, such that printed content is printed on the first surface and no content is printed on the second surface.

It is particularly preferred that the pressure activated adhesive is activated at a pressure of 300 psi or greater. When a digital press is used, this activation pressure is sufficiently high to ensure that activation will not occur during paper handling or printing within the digital press itself.

In another aspect, the invention provides a multiple ply paper article comprising a first paper stock and a second paper stock, wherein both the first paper stock and the second paper stock have a first printed surface and a second adhesive surface, wherein the second adhesive surface has a pressure activated adhesive applied thereto, and whereby the first paper stock and the second paper stock are bonded together in registration by their respective second adhesive surfaces. Preferably the multiple ply paper article is a business card, or a sheet comprising a plurality of business cards.

BRIEF DESCRIPTION OF DRAWINGS

Specific embodiments of the invention will now be described, by way of example, with reference to the accompanying drawings, of which.

DESCRIPTION OF SPECIFIC EMBODIMENTS

Figure 1:
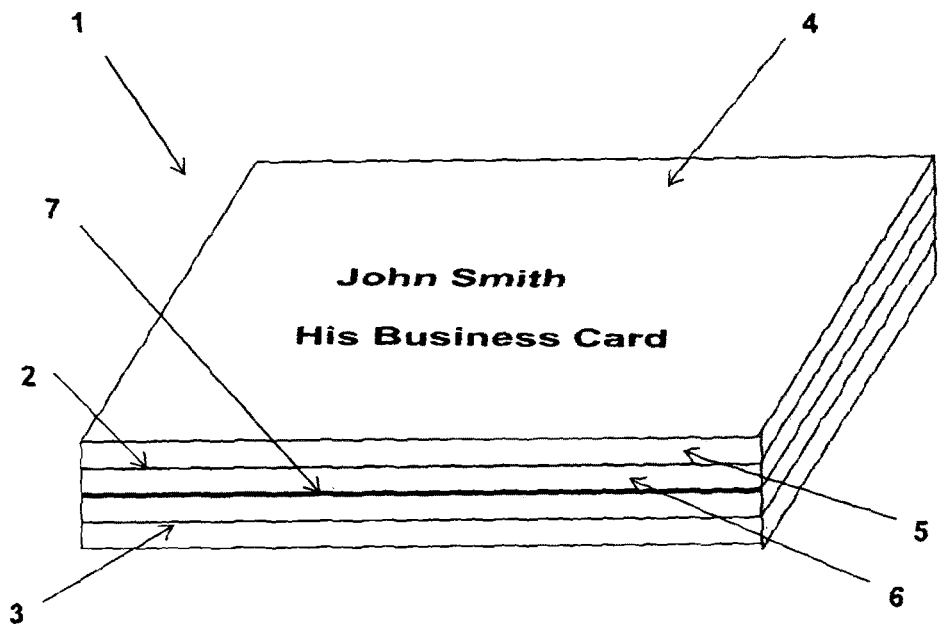
FIG. 1 shows a business card product in accordance with an embodiment of the invention.

FIG. 1 shows a multiple ply paper article—in this case, a business card—in accordance with an embodiment of the invention. The multiple ply paper article 1 comprises a first paper stock 2 and a second paper stock 3, wherein both the first paper stock and the second paper stock have a first printed surface 4 and a second adhesive surface (not shown, illustrated in FIGS. 4a and 4b). In this case, each paper stock comprises a white ply 5 and a coloured ply 6. Each adhesive surface has a pressure activated glue applied to it, as will be described further below. The first paper stock 2 and the second paper stock 3 are bonded together in registration by their respective second adhesive surfaces, the bonding being shown by adhesive contact region 7.

Figure 2:
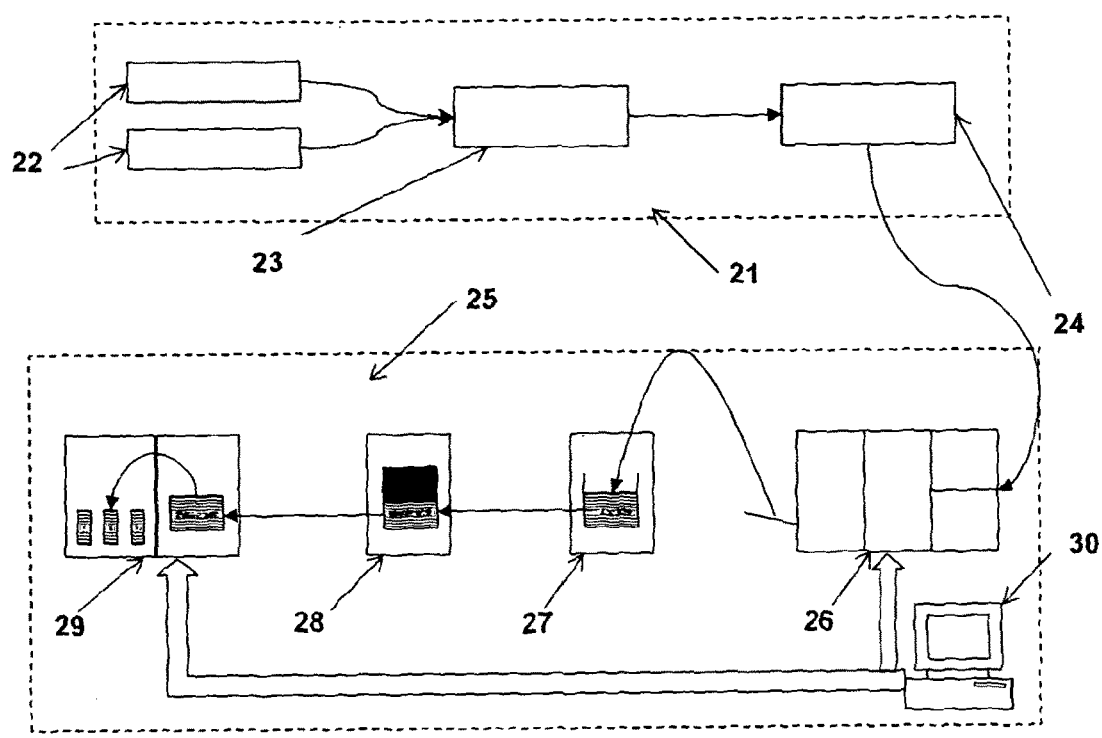
FIG. 2 shows the elements of a system used to carry out process steps according to embodiments of the invention.

FIG. 2 shows the elements of a system used to carry out process steps according to embodiments of the invention. Paper fabrication plant 21 is shown schematically—this contains appropriate equipment for a series of processes: paper manufacturing equipment 22 for fabricating each ply of the paper stock, a laminator 23 for bonding the two plies together and a glue applicator 24 for applying the pressure activated glue to the relevant ply. This equipment is conventional—for example, such a glue applicator is used by Mohawk Fine Papers, Inc. to produce papers with pressure activated glue applied to one side (marketed commercially as "Mohawk Pressure Sensitive").

The remaining elements are here provided at a printing facility 25. A printer 26 (for example, an HP Indigo digital printer) prints on the glueless paper surface and produces a stack of printed paper. A registration device 27 is used to bring the sheets into stack into proper registration with each other, and a press 28 is used to apply pressure and so bond the two ply sheets into four ply sheets. The bonded sheets are then fed into a cutting and packaging apparatus 29 which cuts the bonded sheets into the desired end product and organises and packs them appropriately. The printer 26 and cutting and packaging apparatus 29 may for example be comprised in a system adapted to produce business cards according to the applicant's "Printfinity" process, as described in the applicant's earlier WO 2007/129102. The organisation of printed content may be determined by processes indicated in WO 2007/129102 by appropriate software applications running on suitable servers and clients—represented generically here by computer 30 and network connection to the printer 26 and cutting and packaging apparatus 29.

Figure 3:
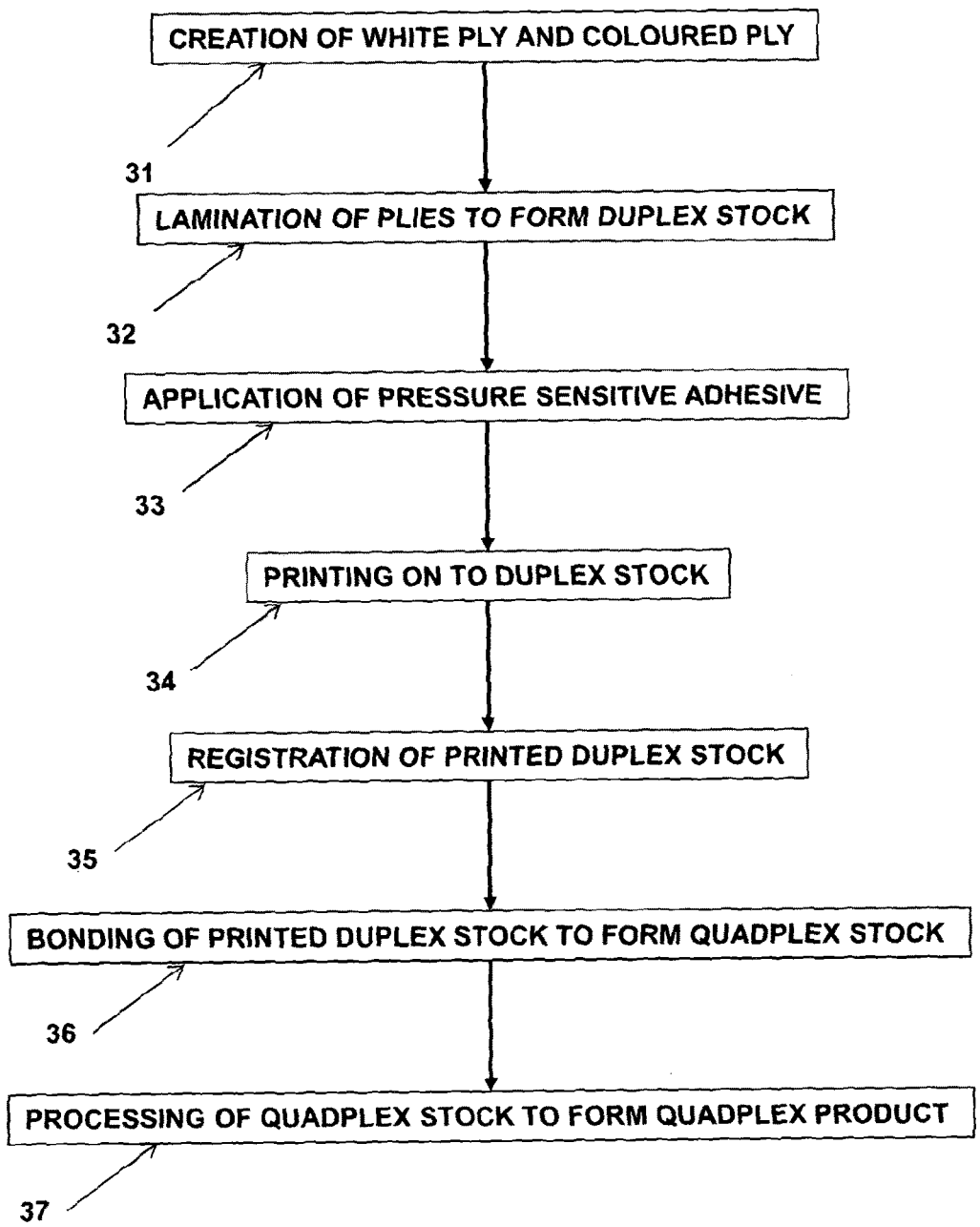
FIG. 3 is a flow diagram illustrating method steps used in embodiments of the invention.

FIG. 3 illustrates schematically method steps involved in creation of a multiple ply paper product according to embodiments of the invention. Not all these steps are required in all aspects of the invention. FIGS. 4a to 4e illustrate the effect of relevant steps on the part-formed paper product. In the embodiment described, the approach is that used in the production of the applicant's "QuadPlex" paper and its use in the production of business cards. QuadPlex is a 4 ply paper that, when viewed in cross-section, has a coloured line running through its centre. It is produced by a manufacturing process suitable for printing with a digital press (for example, the HP Indigo product family).

Figure 4A:
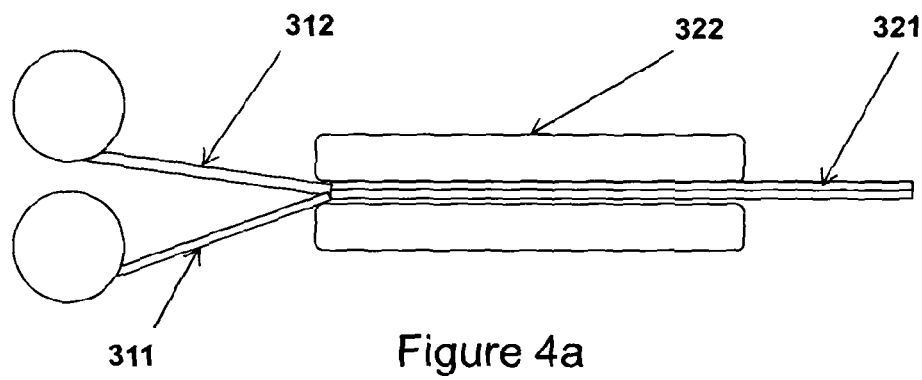
FIGS. 4a to 4e illustrate the construction of the business card product of FIG. 1 according to an embodiment of the invention following the steps shown in FIG. 3.

In step 31, two paper plies are formed by conventional processes—in this case, these two plies are a white ply 311 and a coloured ply 312 (though there is no particular functional significance to the use of white and coloured plies—these are described here because the combination creates a desirable product type). In step 32, as also shown in FIG. 4a, these two paper plies are laminated to form a duplex paper 321 with one white surface and one coloured surface at a laminating station 322.

Figure 4B:
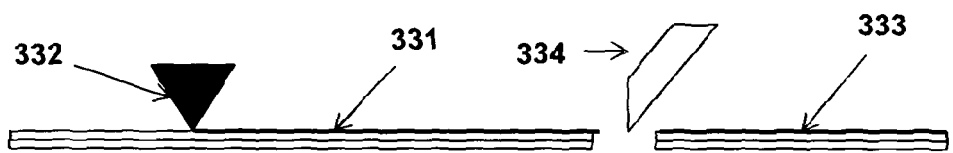

In step 33, as also shown in FIG. 4b, the coloured ply has a pressure sensitive glue 331 applied to its exposed side at a glue application station 332 and a paper stock 333 suitable for printing is formed from the duplex paper by cutting apparatus 334 or otherwise. The choice of glue needs to satisfy one main requirement—this is that printing on to the unglued surface of the duplex paper stock will not be affected by it. In addition to the printing step itself, it is important that the choice of glue will not affect the feeding of sheets in the printer, leading to printing errors or unpredictable printing results. The adhesive therefore needs to be a low tack adhesive that will not prejudice sheet handling and to be pressure activated at a sufficiently high pressure that activation will not occur during a printing process. Activation at 300 psi is sufficiently high to prevent a risk of activation during conventional printing—adhesive coated papers with sufficiently low tack and sufficiently high activation pressure for these purposes are produced by Mohawk Fine Papers, Inc. as described above (e.g. Mohawk Pressure Sensitive, Mohawk Panoramic).

This approach is needed as the four ply QuadPlex product is too thick to be fed through a conventional digital press for printing. The approach taught here, in which the front face and the rear face of the product are printed separately, with the other faces of each product half glued together, allows products of this type to be produced without modification to a conventional digital press. A prior art approach is known for producing a postcard product—as described at http://www.convertiblesolutions.com/products/fold-n-go/double-thick-impact-card, this approach uses a single printed sheet which is then folded at a perforation line—but this does not provide the degree of registration required for a high quality business card product and constrains the available post-processing of the assembled paper.

Figure 4C:
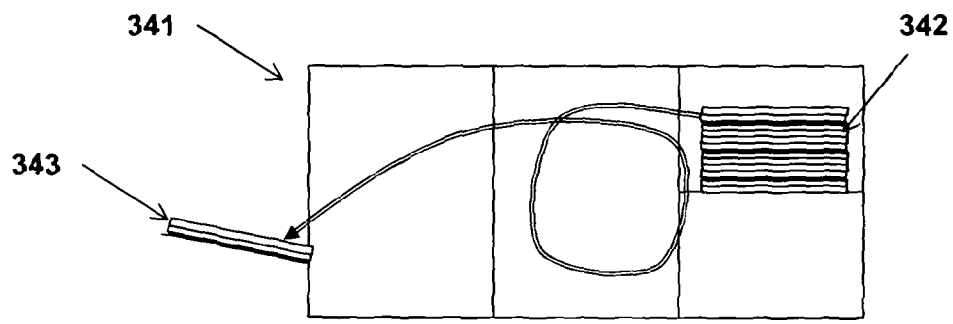

In step 34, as shown in FIG. 4c, the printer 341 prints on to the duplex paper stock 342. In this embodiment, there is printing on both sides of the eventual card product. The duplex paper stock 342 is stacked alternately white side up and coloured side up, so that this orientation is preserved in the stack of printed duplex paper stock 343. As a printer will not generally be configured to print only on the reverse of a sheet, the printer may need to be configured to "print" to both sides of the sheet, but in such a way that the coloured sheet remains blank with all content printed on the white sheet—essentially this will involve amending the original print job to include a number of blank pages equivalent to the number of printed pages, arranged alternately after and before each printed page. For a print job according to the Printfinity process where the output will be a number of card stacks of N cards, the duplex paper stock will include 2N sheets, N sheets being in the white side up orientation and N sheets in the coloured side up orientation.

Figure 4D:
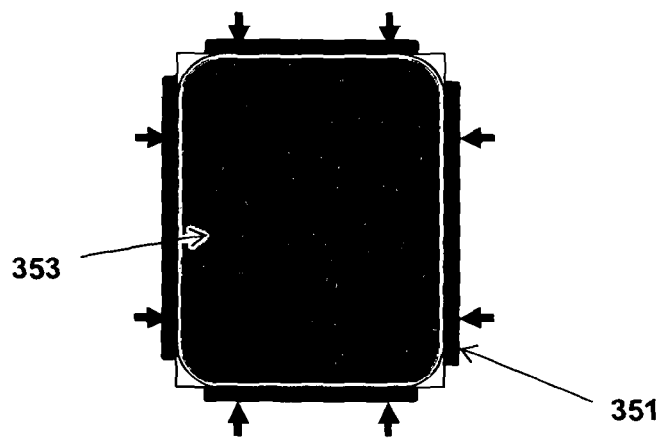

In step 35, the printed duplex stock is brought into registration, as is also shown in FIG. 4d. A registering device 351 is used to ensure that the side boundaries of the stack 352 of printed duplex paper stock are as smooth as possible, so that each pair of sheets in the stock are in good alignment with each other. Registration is then maintained during step 36 in which each two sheets of the duplex stock are brought together (coloured sheet to coloured sheet) and pressure is applied to activate the glue. This may advantageously take place in a stack—FIG. 4d shows a press member 353 acting on the stack 352 of printed duplex stock while still located in the registration device 351.

If the pressure sensitive glue is only activated above a certain pressure threshold (say 300 psi—there are suitable pressure sensitive glues activated at this pressure), then digital printing can take place effectively if pressures experienced by a sheet in the printing process are sufficiently far below the pressure threshold that the glue on the sheet will not be activated. This is the case for a conventional digital press.

Figure 4E:
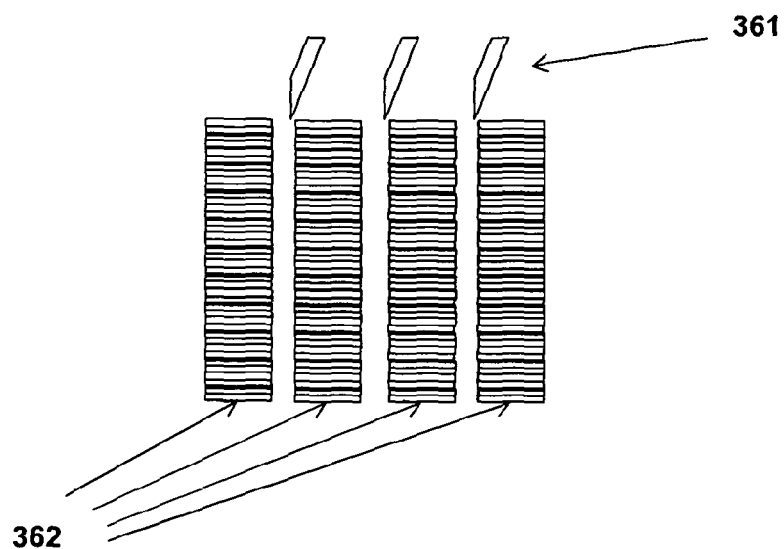

For some embodiments of the invention, this will be the final step, as the finished product will be formed after the QuadPlex paper is assembled. However, in other embodiments there will be further post-processing steps, as the result of the assembly step 36 is to produce a stack of QuadPlex sheets. These may for example be separable into separate stacks of business card products using the Printfinity process described in WO 2007/129102—the printed content is organised over all the QuadPlex sheets in a stack so that, as shown in FIG. 4e, when separated by vertical cuts through the stack (using guillotine blades 361—only one of two orthogonal cutting directions is shown for convenience), card stacks 362 each provide a set of business cards for one user according to a desired print pattern (these could be identical cards for a single user, or could follow any approach desired by the user, for example with content varying from card to card).

As the person skilled in the art will appreciate, many modifications and variations may be made to the embodiments described here while remaining within the scope of the invention as claimed.

The invention claimed is:

1. A method of producing a printed multiple ply paper comprising:
   providing a paper stock having a first surface and a second surface, applying a pressure activated adhesive to the second surface, printing upon the first surface after the pressure activated adhesive has been applied to the second surface, and bringing together two portions of the second surface under pressure in registration to form a multiple ply product;

wherein the pressure activated adhesive is activated at a pressure of 300 psi or greater, wherein the step of printing upon the first surface comprises printing, separtely, on a first sheet of the paper stock and a second sheet of the paper stock, wherein the step of bringing together the two portions of the second surface under pressure in registration comprises bonding the respective second surfaces of the first sheet and the second sheet via their respective pressure activated adhesives, and wherein the first and second sheets of paper stock are not physically connected prior to the bonding of the respective second surfaces of the first sheet and the second sheet.

2. A method as claimed in claim 1, comprising printing a stack of first sheets and second sheets in sequence, such that on bringing together the two portions of the second surface under pressure in registration the second surfaces of each first sheet and its corresponding second sheet are bonded together to form a stack of bonded sheets.

3. A method as claimed in claim 2, wherein each first surface is divided into a plurality of discrete card stack areas, and wherein after formation of the stack of bonded sheets the discrete card stack areas are separated to form a plurality of discrete card stacks.

4. A method as claimed in claim 1, wherein the paper stock is a duplex stock.

5. A method as claimed in claim 4, wherein one layer of the duplex stock has one colour and the other layer has another colour.

6. A method as claimed in claim 5, wherein one layer of the duplex stock is white.

7. A method as claimed in claim 1, wherein the multiple ply product is a business card.

8. A method as claimed in claim 1, wherein printing said first surface comprises printing on the first surface in a digital press.

9. A method as claimed in claim 2, wherein the paper stock is a duplex stock.

10. A method as claimed in claim 2, wherein the multiple ply product is a business card.

11. A method as claimed in claim 10, wherein one layer of the duplex stock has one colour and the other layer has another colour.

12. A method as claimed in claim 11, wherein one layer of the duplex stock is white.

13. A method as claimed in claim 2, wherein printing said first surface comprises printing on the first surface in a digital press.

14. A method as claimed in claim 13, wherein printing said first surface comprises printing in a duplex mode, such that printed content is printed on the first surface and no content is printed on the second surface.

* * * * *